United States Patent
Eiras et al.

(10) Patent No.: US 9,170,856 B2
(45) Date of Patent: *Oct. 27, 2015

(54) MESSAGE TRAFFIC INTERCEPTION SYSTEM

(75) Inventors: Jan Phillippe Eiras, Wellington, FL (US); Martin Ripper, Palmdale, CA (US)

(73) Assignee: Quadrus Corporation, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/093,659

(22) Filed: Apr. 25, 2011

(65) Prior Publication Data

US 2012/0036275 A1 Feb. 9, 2012

Related U.S. Application Data

(63) Continuation of application No. 10/065,793, filed on Nov. 19, 2002, now Pat. No. 7,958,267.

(51) Int. Cl.
*G06F 15/16* (2006.01)
*G06F 9/54* (2006.01)
*H04L 29/12* (2006.01)
*H04L 29/06* (2006.01)

(52) U.S. Cl.
CPC .............. *G06F 9/541* (2013.01); *G06F 9/542* (2013.01); *H04L 61/2557* (2013.01); *H04L 29/06068* (2013.01)

(58) Field of Classification Search
CPC ................. H04L 29/06068; H04L 61/2557
USPC ......... 709/201, 202, 203, 204, 206, 207, 230, 709/231

See application file for complete search history.

(56) References Cited

U.S. PATENT DOCUMENTS

| | | | | |
|---|---|---|---|---|
| 5,675,780 A * | 10/1997 | Plant-Mason et al. | ................. | 1/1 |
| 6,023,581 A * | 2/2000 | Matsuura | ................. | 714/4.1 |
| 6,028,846 A * | 2/2000 | Cain | ................. | 370/250 |
| 6,081,509 A * | 6/2000 | Magiros et al. | ................. | 370/241 |
| 6,163,881 A * | 12/2000 | Sauvage | ................. | 717/128 |
| 6,763,040 B1 * | 7/2004 | Hite et al. | ................. | 370/522 |
| 2002/0116530 A1 * | 8/2002 | Burgess | ................. | 709/246 |
| 2002/0188688 A1 * | 12/2002 | Bice et al. | ................. | 709/206 |

* cited by examiner

*Primary Examiner* — Dhairya A Patel
(74) *Attorney, Agent, or Firm* — Ann I. Dennen; Lanier Ford Shaver & Payne P.C.

(57) ABSTRACT

The present invention is a message traffic interception system including a computer-readable medium, a protocol independent execution manager module stored on the medium, the execution manager module having one or more scenario modules which can process an array of predetermined rules for intercepted message traffic, and an interface communication emulator module communicatively coupling protocol-specific message traffic to the execution manager.

21 Claims, 10 Drawing Sheets

MESSAGE TRAFFIC INTERCEPTION SYSTEM

CROSS-REFERENCE TO RELATED APPLICATIONS

This application is a continuation of and claims priority to U.S. patent application Ser. No. 10/065,793, entitled "Message Traffic Interception System," filed on Nov. 19, 2002, which is incorporated herein by reference.

SUMMARY OF INVENTION

Testing and integrating systems that communicate with one another is a difficult and expensive task. It is particularly difficult when multiple communication flows must be addressed simultaneously. Often integrators improvise tools on an "ad hoc" basis or create tools from scratch to monitor the communications between each interface. Oftentimes these project specific tools require instrumentation of the actual software under test to achieve access. These alterations can impact the base software in ways not intended by the initial creators. Test-unique code is undesirable from a philosophical, operational and cost efficiency standpoint.

Philosophically, modifying the unit under test to enable the test introduces ambiguities into the equation and can reduce overall process control. If a problem is seen, is it a result of an actual design or implementation flaw or is it an artifact of the test modifications? After testing is complete, is the test instrumentation to be removed from the system? How is it then verified that what is now running is equivalent to what was tested? Even if all the testing was successful, how can it be verified that the system wasn't broken when the test code was removed? Operationally, the testing and integration of these interfaces is often accomplished under considerable budgetary and schedule pressure. Integrators must develop custom tools for each interface and, due to budget and schedule pressure, these tools are often minimal in functionality. They amount to ad hoc utilities written to test specific items written on the fly by the test engineers themselves. Alternatively, the program may have budget for a "tools" group that will develop more extensive tools, at high cost, but these tools rarely provide any reusability beyond the specific interfaces being tested.

There is a need in the art for a reusable message traffic intercept tool that enables rapid deployment and high functionality.

There is another need in the art for a message traffic intercept tool that is portable and nonproprietary across different interfaces and protocols.

There is another need in the art for a message traffic intercept tool that enables testing, analyzing and simulating of message communications without tampering with the source code of the applications under examination.

There is another need in the art for a message traffic intercept tool that enables interfaces using different protocols to communicate with each other.

There is another need in the art for re-usable data reduction and analysis tools that allow the interpretation, display, manipulation, and production of reports from recorded data regardless of origin.

The present invention is a low-cost, customizable system for non-intrusively testing the interaction of interfaces amongst components of nearly any system or systems. The invention accomplishes this by simulating the components' expected interfaces and acting as a communications "wire tap", capturing and processing real-time message traffic, and then analyzing and acting on the results. If the system is part of a test configuration, this can all be done with no modifications to the units under test.

The system of hardware and software building blocks, coupled with customized interfaces, aids automating the component integration, interface testing, and documentation of large systems. The present invention listens to and records multiple systems "talking" to each other. It allows one to enter into the "conversation" at any time to simulate an error, such as a garbled message, data flow error, etc. Even more, the system can intelligently modify a message or set of messages, suppress existing messages, and even insert completely artificial messages into the data stream to simulate internal states that cannot be achieved any other way. This provides the ability to perform otherwise impossible tests that would require the creation of actual problems or "real" damage to the system.

The present invention tests the robustness of a system, where after a problem is injected into the "conversation", the response can be analyzed for correction or enhancement. All of this with real-time data capture and loop capabilities to keep the systems operating uninterrupted in real-time.

The advantages in having this kind of user-level protocol driven testing and simulation tool for a system are clear. Tools like this can shorten the testing schedule dramatically, yet lower risks by allowing more thorough testing and allowing the testing of what is actually delivered to the customer, rather than an instrumented or test-modified version of the system. The biggest stumbling block to having this kind of test and simulation tool is cost. Developing this kind of capability from scratch for each new system and component, and maintaining it in the face of changing interfaces is prohibitively expensive. The result is that developers and testers often settle for primitive tools, or simply go without.

The present invention changes that equation by providing the capability at a fraction of the cost of completely custom developed tools by eliminating most of the custom development. The invention encapsulates the elements that are common to all message-based interfaces in the off-the-shelf core software components. If any modifications to the systems under test are needed to use the invention, only the low-level communications protocols and hardware for each implementation need to be modified. Therefore, the cost and time to implement a fully customized tool set for each system is much lower than what would be required for an in-house custom solution.

The present invention provides a heretofore unknown solution for the integration of various systems operating on multiple platforms without compromising the integrity of the system under test. It is the one tool-set that is easily customized for any application on any platform and can be re-used over and over in a variety of testing scenarios.

Cost savings are achieved due to increasing the efficiency and accuracy of testing without wasting time on developing "ad hoc" project specific solutions that can impact the integrity of the system being tested. Schedule savings are achieved due to the shortened turn-around time of test results and analysis. Risk is reduced for those reasons and because the invention allows the creation of simulations and tests that would have been impossible or cost prohibitive otherwise.

A complete test system can be created from these building blocks and adapted to a variety of applications with appropriate drivers, hardware, and relatively minor software changes.

The present invention is a message traffic interception computer product including a computer-readable medium, a protocol independent execution manager core module stored on the medium, the execution manager core module having a scenario which comprises predetermined rules for intercepted message traffic and an interface communication emulator module communicatively coupling protocol-specific message traffic to the API core. A message database is communicatively coupled to the execution manager core module; the message database further includes an array of message properties for each message. The array of message properties may include message interpretation data, message formatting data, message routing data, message default values, message transmission rules, enable-lockout combination data, limits on message field values, message field units, user-defined identifiers, or interface information. The database may also contain other information about the messages that can be used to derive data items, modify messages, or document the interface.

A scenario module is communicatively coupled to the message database, the scenario module further includes a state machine emulation definition, the definition providing event-driven parameters responsive to message traffic. The event-driven parameters may discriminate between messages based on message identification, on message contents, on message occurrence, on message frequency, on a count of the number of times an event's parameters have been satisfied, or on a comparison with variables. Furthermore, when the event's parameters are satisfied, a series of user-definable actions is invoked that may modify the contents of a message, route a message, delete a message, control other events, perform calculations, control user displays, or extract one or more values from a message. Other possible actions include reading data from a file, invoking internal or external subroutines, and controlling connections. The architecture allows for new types of actions to be added as needed.

The interface communications emulator (ICE) module is communicatively coupled to the execution manager. The ICE module receives messages and reformats them into a scenario compliant structure. The messages are then passed on to the execution manager for processing through the scenario Module. Outbound messages generated by the Scenario module are passed back to the communications interface emulator module by the execution manager for protocol-specific transmissions.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

The present invention enables the creation of communications systems including communication test tools that separate the physical and logical interfaces from the handling of the messages themselves. Message sources and sinks are treated as black boxes that separate the actual sending and receiving of messages from the processing of messages. Configured as a test tool, it enables nearly transparent testing of communications links by providing the external interfaces of both units under test and acting as a bridge between them. The units under test are unaware that they are not connected to each other, but rather to an emulator and the execution Manager module monitors, records, and controls the interaction on the link.

The objective of the invention is to create a platform-independent set of building blocks that can be used to create tools that will specify, implement, test, and simulate any inter-process communication (IPC) mechanism and provide data analysis tools for the resulting recorded data. A preferred embodiment of the invention includes:

1) A protocol independent execution manager module;
2) A message database;
3) A scenario module comprising a state machine emulation;
4) An interface communication emulator (ICE) module; and
5) A post-test data analysis suite.

The message database is used to define precisely what a message looks like in its transmitted form. It contains a bit-by-bit description of each field in the message and information on how those bits should be interpreted and formatted. In addition, the message database contains information about each interface that exists in the system, default routing information for each message, and holds the default values for the fields in each message. The database provides a complete description of a user-defined message. Any file format may be used to save this information. The message database will also contain other data about the message set such as transmission rules, enable/lockout combinations, limits on field values, units, and user-defined identifiers.

The scenario module is a framework that allows the user to define a state machine that can respond to various inputs. The inputs fall into the categories of message arrivals, timer expiration, system events, and persistent storage changes. Two pseudo-events are also defined the Start of scenario and the scenario Stop Events. The state machine is communicatively coupled to the message database, allowing identification and interpretation of the contents of a message. When an input satisfies a set of conditions for the current state, it is referred to as a message event. The message event can discriminate between messages based on message identification, message contents, occurrence and frequency counts, a count of the number of times the event's conditions have been satisfied, and comparisons with variables.

When the event occurs, a series of user-defined actions are performed. The actions that are defined for the system are modifying the contents a message, routing a message, deleting a message from the input queue, enabling or disabling other events, perform calculations, retrieve data from external sources (files), control user displays, and extract values from a message. There are also flow control actions for decision making and looping. These actions are selected and specified by the user when a scenario module is defined. Once the execution of the series of actions is associated with an event is complete, the scenario module is ready for the next input. This gives the user complete control over the message stream being passed through the scenario module.

The interface communication emulator (ICE) module is a component that handles the actual receipt and transmission of messages on a specific type of interface. Messages are received and reformatted into the standard scenario compliant structures. Once that is completed, messages are handed to Scenario module. When the scenario module processing is complete, outgoing messages are passed back to the appropriate emulator. An ICE unit will consist of hardware and/or software as appropriate for a specific interface type.

The execution manager coordinates the activities of the other modules. It provides a framework for communications between an ICE unit and the scenario module, makes provision for loading the scenario or scenarios that are to be executed, and coordinates the activity of all the other modules. The execution module also provides a user interface for the software, either as an integral part of the execution manager module or through communications with a master control program (MCP).

In an embodiment of the invention, an execution manager may include a MCP and will include the infrastructure needed to tie a specific set of interface communication emulator modules to the scenario module. The MCP may be an integral part of the application or it may be a separate executable that controls one or more execution manager modules units remotely. Each execution manager may control one or more interface communications emulation modules. The MCP provides the user interface to the application. Selection of scenario modules, configuration of interface communication emulator modules, scenario module control, and user preference configuration are all controlled from the MCP. If, in a given embodiment, the MCP is subsumed in the execution manager, all of the listed capabilities are still provided to the user. In addition, the MCP controls logging and provides all user feedback during the execution of a scenario module including the display of user-defined Control Display actions.

Off-line processing means the processing that is done on data recorded during live runs of the invention. It can include such items as data analysis and reduction, report generation, preparation of recorded data for replay, and generation of alternate representations of the data (including such formats as XML, NET-CDF, etc.) for the use of other tools. It also includes such processes as the production of interface description documents from the message database, translation of scenarios into ASN.1 notation or other human-readable forms, interface and communications source code generation in various computer languages.

Figure 1:
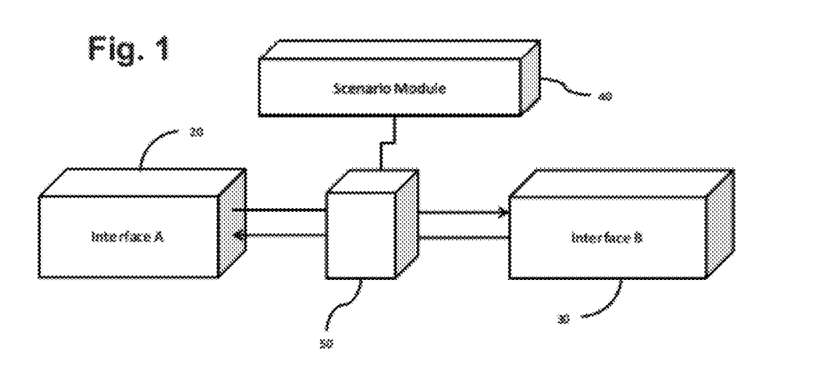
FIG. 1 is a diagrammatic view of the invention.

Referring initially to FIG. 1, protocol independent execution manager module 40 is communicatively coupled to a scenario module executing one or more scenarios for intercepting message traffic between Interface A 20 and Interface B 30. The scenario module is communicatively coupled to interface communication emulator module 50.

Figure 2:
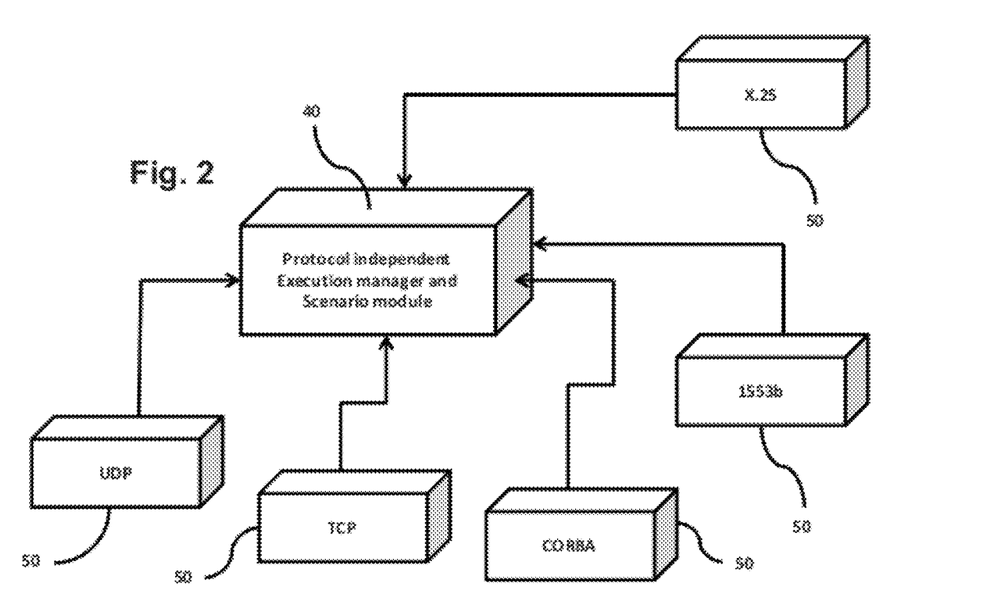
FIG. 2 is a diagrammatic view of the invention showing a plurality of Interface. Communication Emulator modules.

FIG. 2 illustrates only a small sample of the possible Interface Communication Emulator modules 50 including X.25, 1553b, CORBA, TCP and UDP. The present invention should not be construed as limited to the few noted in this specification. There are hundreds of well-known protocols for which Interface Communication Emulator modules may be developed.

Figure 3:
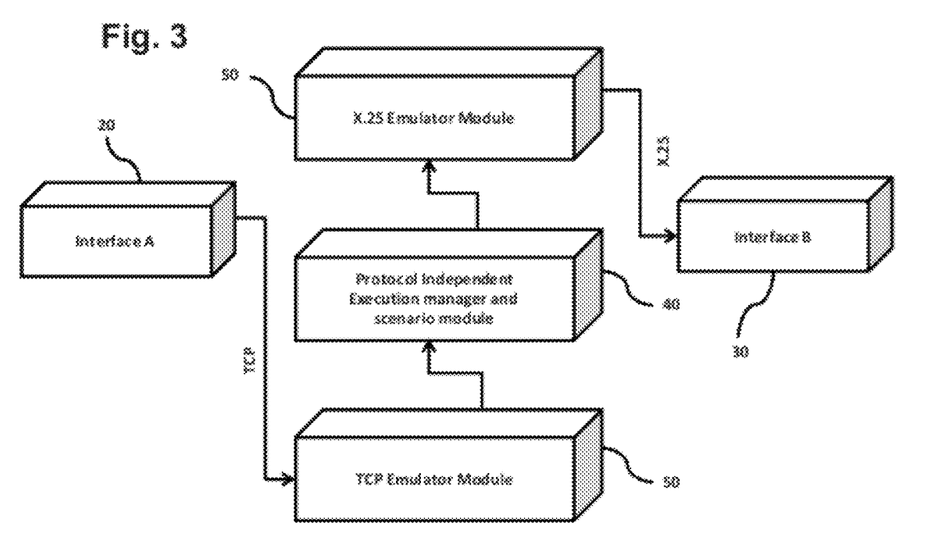
FIG. 3 is a diagrammatic view of the invention wherein the protocol independent execution manager module translates messages between TCP and X.25 protocols.

In FIG. 3, another advantage of invention is demonstrated wherein Interface A 20 communicates by TCP protocol and Interface B 30 communicates by X.25 protocol. Message handling rules may be quickly developed and executed in the scenario module 40 to permit both interfaces to seamlessly communicate with each other by use of an X.25 emulator module and a TCP emulator module communicatively coupling the respective interface to the execution manager and scenario modules.

Figure 4:
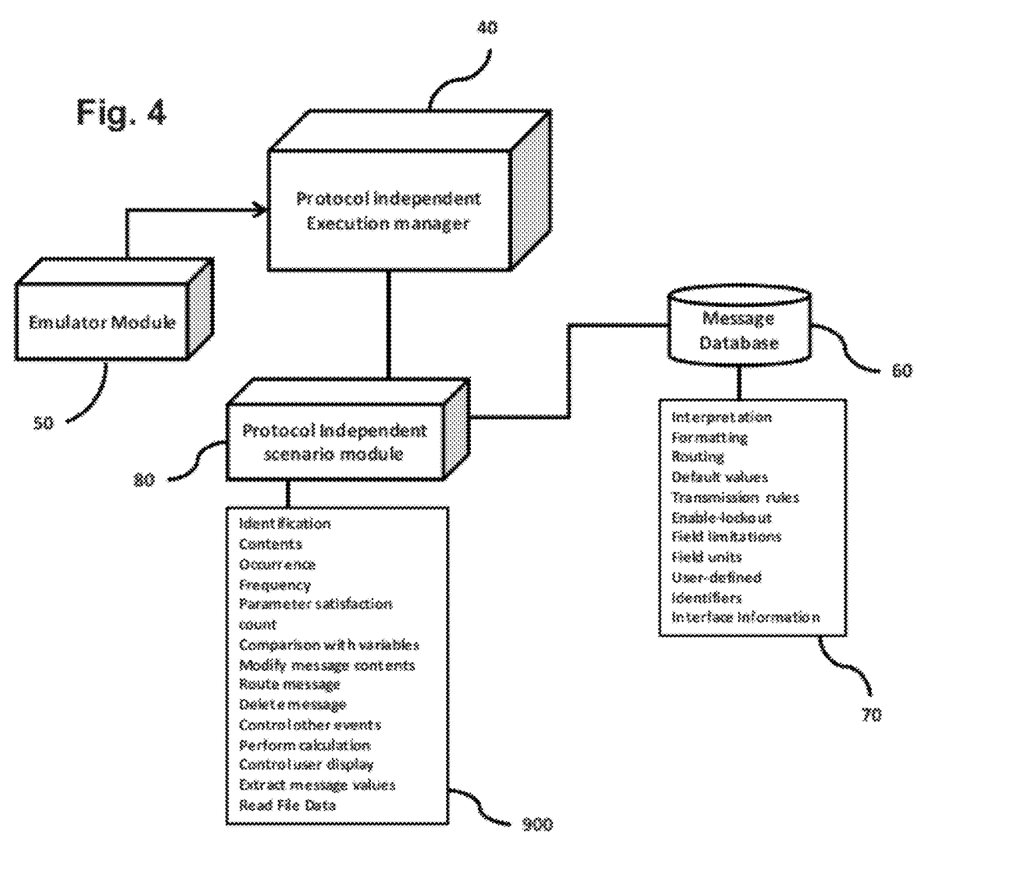
FIG. 4 is a diagrammatic view of an embodiment of the invention deploying a message database and scenario module.

In FIG. 4, message database 60 is communicatively coupled to the scenario module 80 which is communicatively coupled to the execution manager module 40. Message database 60 further includes an array of message properties for each message. An array of message properties 70 may include message interpretation data, message formatting data, message routing data, message default values, message transmission rules, enable-lockout combination data, limits on message field, values, message field units, user-defined identifiers, or interface information.

Scenario module 80 is communicatively coupled to message database 60, scenario module 80 further includes a state machine emulation definition, the definition providing event-driven parameters 90 responsive to message traffic. Event-driven parameters 90 may discriminate between messages based on message identification, on message contents, on message occurrence; on message frequency, on a count of the number of times an event's parameters have been satisfied, or on a comparison with variables. Furthermore, event-driven parameters 90 may modify the contents of a message, route a message, delete a message, control other events, perform calculations, control user displays, extract one or more values from a message, or read data from a file.

Communications interface emulator 50 is communicatively coupled to the execution manager module 40. Messages are received from the outside, reformatted into scenario compatible messages and handed to the execution manager. Outgoing messages are accepted from the execution manager, reformatted as appropriate for the external interface, and transmitted on the external interface.

Figure 5:
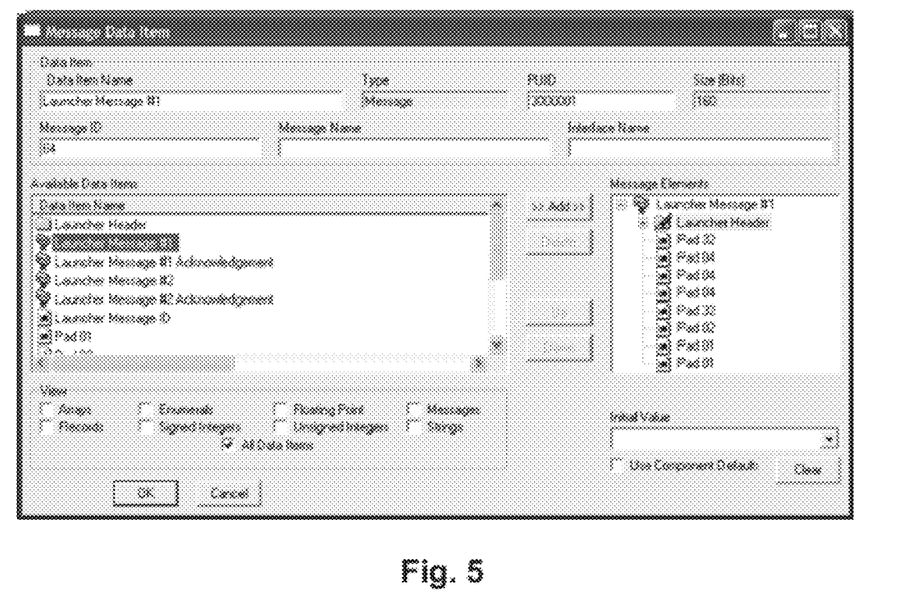
FIG. 5 is a computer interface screen capture showing individual record data in the message database.
Figure 6:
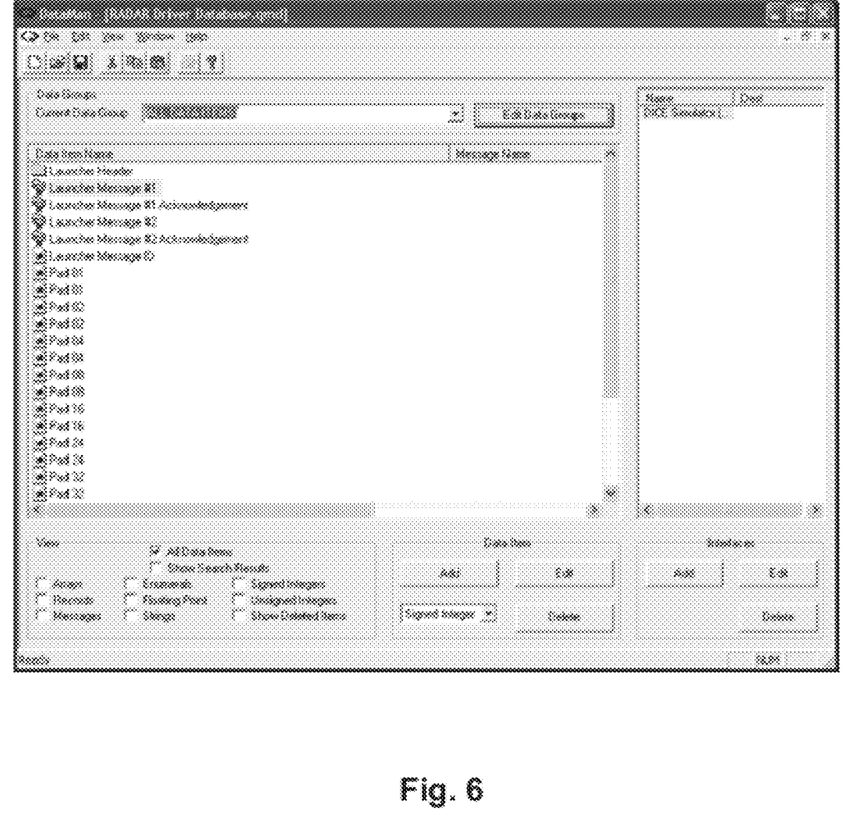
FIG. 6 is a computer interface screen capture showing a top level data-item selection window.
Figure 7:
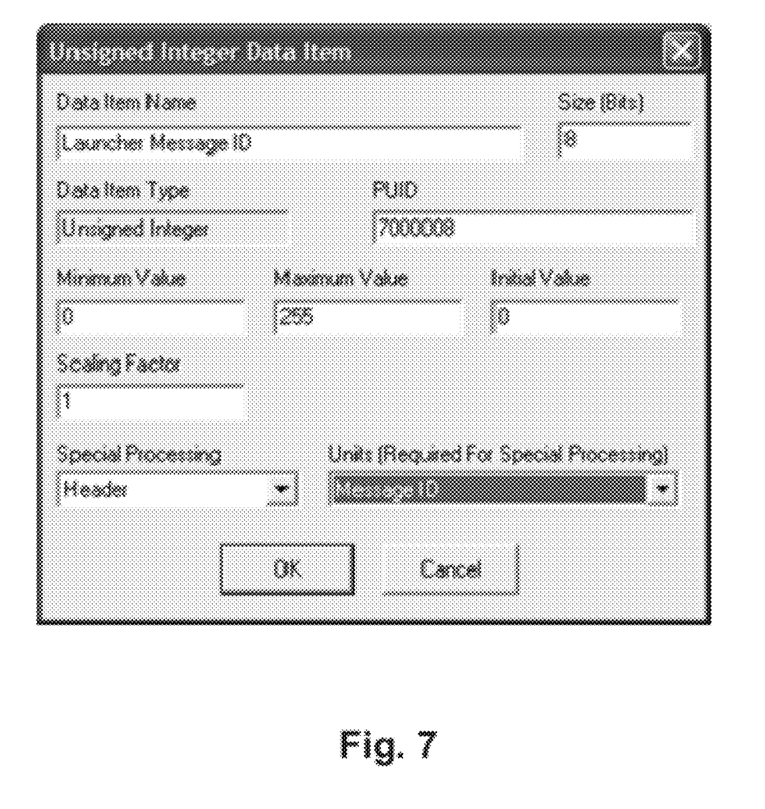
FIG. 7 is a computer interface screen capture showing the properties of an atomic data item.
Figure 8:
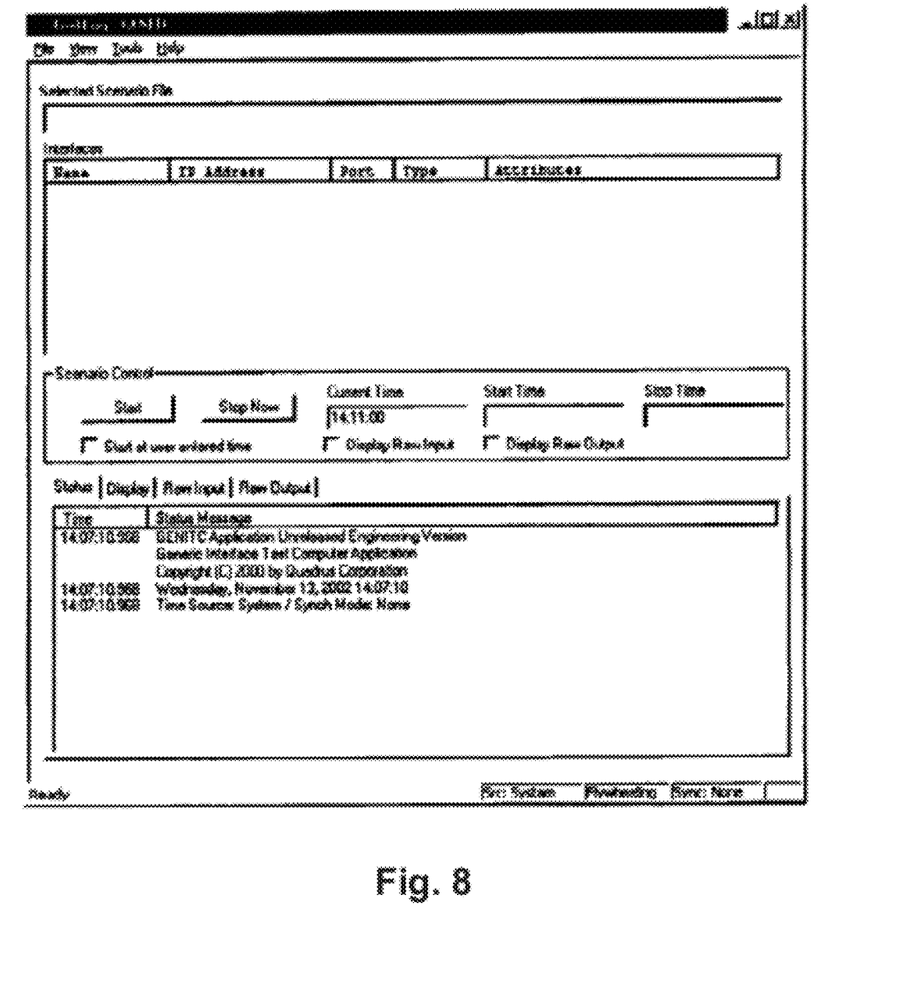
FIG. 8 is a computer interface screen capture showing a test application according to the invention.
Figure 9:
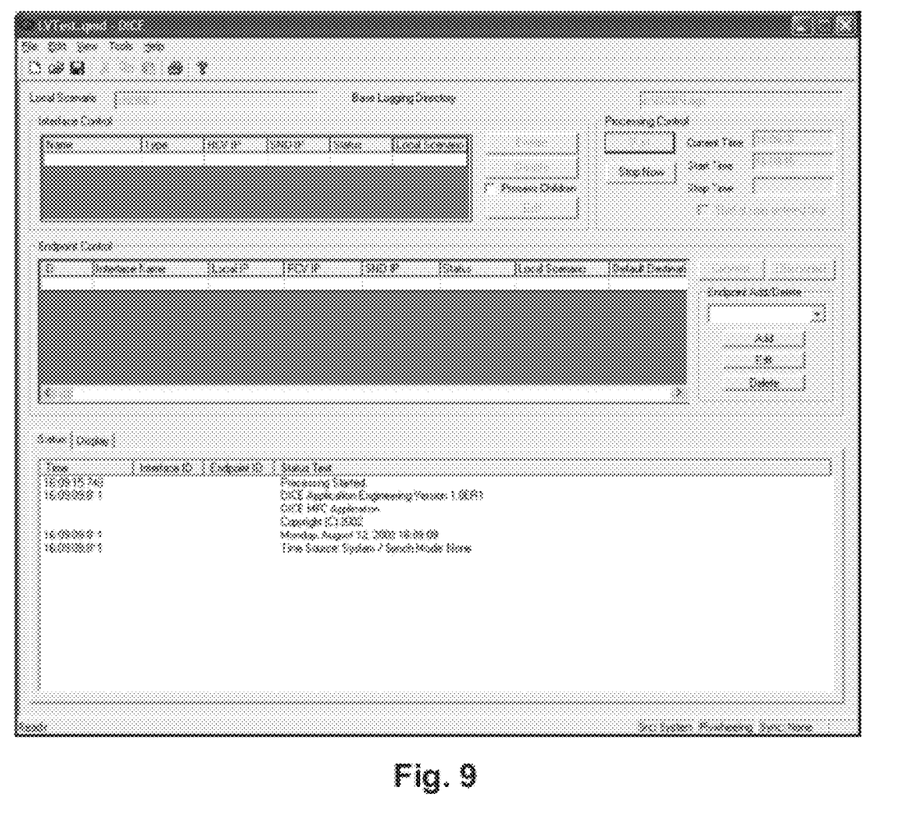
FIG. 9 is a computer interface screen capture showing an alternative test application according to the invention.
Figure 10:
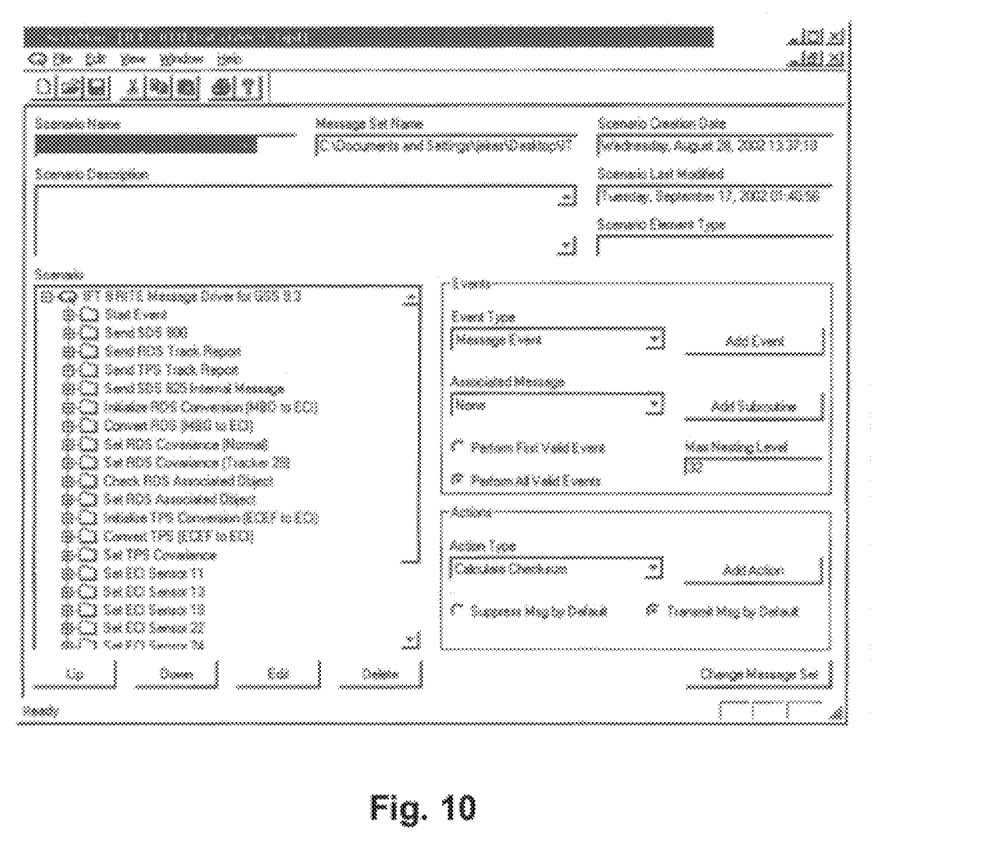
FIG. 10 is a computer interface screen capture showing controls for a scenario module.
Figure 11:
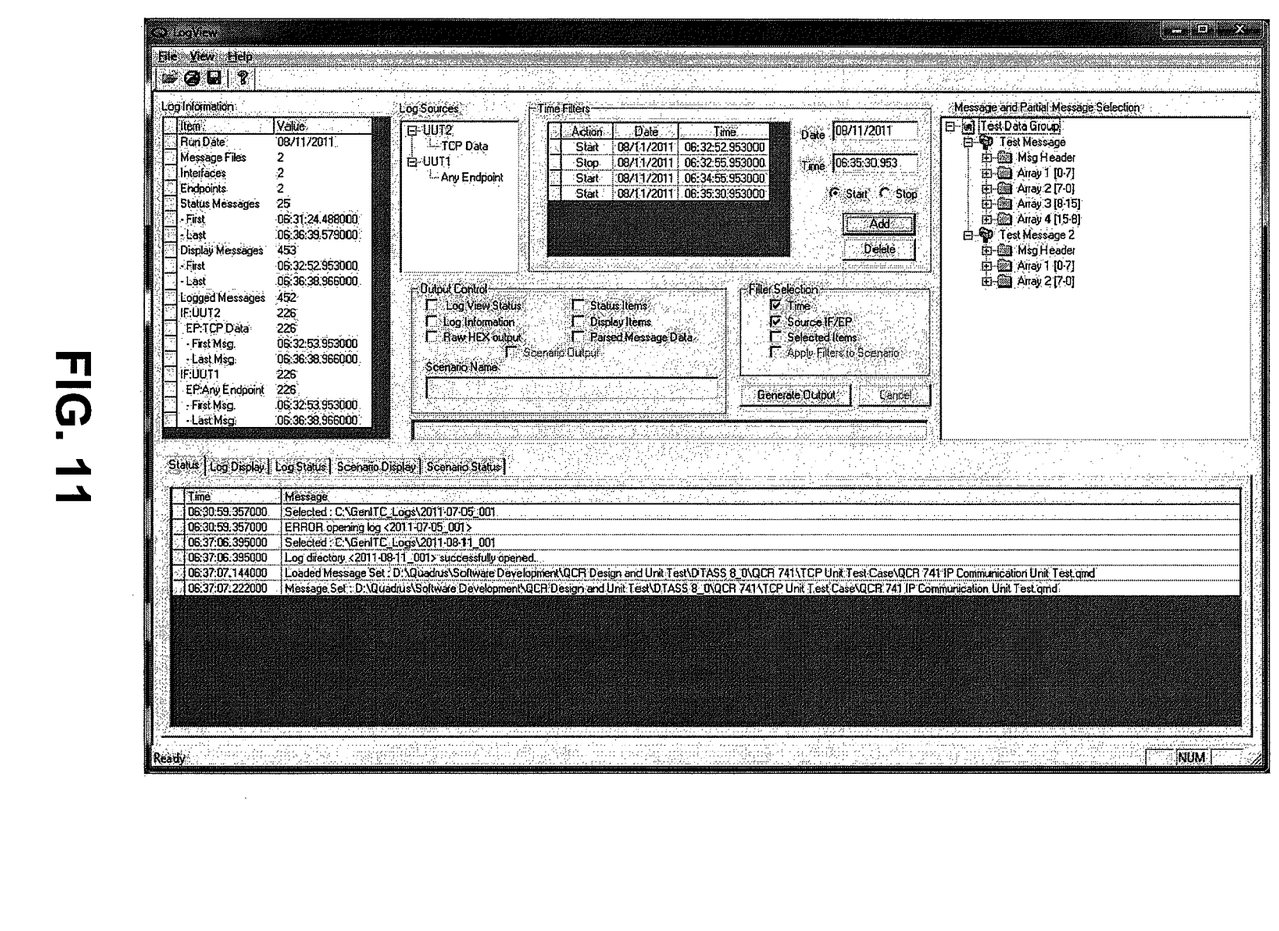
FIG. 11 is a computer interface screen capture of a log view screen.

FIG. 5 shows a Database UI view of a message data item in an embodiment of the invention wherein message fields (which are also data items) are displayed and may be edited. Data groups are shown in FIG. 6 which represent discrete message sets. Each message set is used for communications on a specific external interface type. As shown in the UI, data items may be added, edited or deleted. Interfaces may also be added, edited or deleted through the UI. In FIG. 7, settings for an individual atomic data item, which may be a message field, may be modified. Definitions for minimum values, maximum values, default (or initial) values, scaling factors, size and the like may be specified. FIG. 8 is a computer interface screen capture showing a first test application according to the invention. FIG. 9 is a computer interface screen capture showing a second test application according to the invention. FIG. 10 a sample UI used to create and edit scenarios. FIG. 11 is a post-processing data analysis application UI is shown according to the invention.

The present invention may be deployed as an interface development tool to define and develop an interface. The tools could be used to specify the message sets and generate the source code for the messaging portion of the application. It could even become the interface if it were embedded in an application. The software could also generate the documentation for the interface.

The present invention may be deployed as an interface driver to be used as the "back side" of an interface during development to wring out communications before development of both ends was complete. In this usage, it would be an integration and support tool, rather than in a direct development role.

The present invention could be used to create and coordinate distributed training applications. These applications can simulate an environment for a piece of software and drive operator training scenarios.

The present invention could be used, especially in a distributed mode like DICE, to drive an application with high levels of bandwidth to test its load response characteristics.

The present invention could be used to provide a temporary or permanent translator between systems that must interoperate but do not have matching interfaces (i.e., legacy equipment that uses obsolete communications technologies and need to be tied into a modern system, or disparate sensors that must be adapted to feed an existing control or monitoring application, or command and control elements from different services or even nations).

The present invention could be used, with an appropriate front end, to do data translation on arbitrary data files. Translations of format and content could be performed. For example, a file could be transformed from a format that uses 32 bit integers to one that uses 64 bit integers, while simultaneously converting one given data field from radians to degrees.

The present invention could be used, with an appropriate front end, to do data analysis on arbitrary data files. Using a scenario, specific items can be extracted, accumulated, and formatted for human or machine use.

The present invention could be used to extract data from disparate arbitrary data files and find correllations, trends, and patterns in the data using the file analysis capabilities.

The present invention could be used to receive data from disparate arbitrary data sources and do the analysis and transformation needed to fuse the data into a single data stream. For example, the invention could be used to set up a tool that receives data streams from several different radars. These data streams could be converted so that they all present position in a single coordinate system, and object reports from the different radars could be evaluated to determine if the represent different views of the same object, and the consolidated data stream could then be passed to a tracking application. All of this under scenario control.

The present invention could be used to convert databases from one format to another. Databases would be treated like any other file conversion.

The present invention could be used to intercept database queries and reformat them or redirect them before they are received by the database software or, conversely, it could be used to intercept the query responses and manipulate or route them under scenario control. For example, a security application layer that sits on top of the database could, under scenario control, mask out certain queries or parts of the data that is provided in response based on a classification or access schema encoded as a scenario.

The invention claimed is:

1. A system comprising:
    an input device configured for receiving, data via a graphical user interface, indicative of a user-selected type of an event corresponding to a particular message, wherein the event is defined by a user-selected set of conditions to be met by contents of an incoming message, the input device further configured for receiving data indicative of at least one user-selected operation to be performed upon receipt off the incoming message when the user-selected set of conditions has been meet;

logic configured to receive the incoming message from a first interface, determine a type of communication protocol that is being used in the incoming message, transmit the incoming message to a communication protocol emulator based on the type of communication protocol, translate content of the incoming message from the communication protocol into a translated message in a standard format and determine what type of event has occurred based on the translated message, the logic further configured to determine when the user-selected set of conditions have been met based upon the translated message and to perform the user-selected operation on the translated message based upon the determination that the user-selected set of conditions have been met, the logic further configured to translate the translated message to a format compatible with a second interface and transmit the translated message to the second interface; and a message database, the message database for storing data indicative of one or more messages associated with data indicative of steps to be performed by the logic for processing the one or more messages,
    wherein the data indicative of steps to be performed by the logic further comprises data indicative of steps performed by the logic for translating the message, steps performed by the logic for determining an event has occurred, based on contents of the one or more message, and steps to be performed by the logic for performing at least one operation on the one or more messages.

2. The system of claim 1, further comprising an output device for displaying a graphical user interface for entering the data indicative of the selected event and data indicative of the least one selected operation to be performed on a received message if the selected type of event occurs.

3. The system of claim 1, further comprising a first interface and a second interface, each interface configured to receive and transmit a received message.

4. The system of claim 3, wherein the first interface and the second interface are configured to communicate using the same protocol.

5. The system of claim 3, wherein the first interface and the second interface are configured to communicate using different protocols.

6. The system of claim 3, wherein the logic is further configured to receive the incoming message and perform an operation comprising one or more of modifying contents of the incoming message, routing the incoming message, deleting the incoming message, controlling other events upon receipt of the incoming message, performing calculations, controlling a display device based upon the incoming message, extracting one or more values from the incoming message, reading data from a file upon receiving the incoming message, or executing internal or external subroutines upon receipt of the incoming message.

7. The system of claim 1, wherein the logic is further configured to determine a type of the incoming message based upon the incoming message's message identifier, contents, occurrence, frequency, number of times the selected event has occurred, or comparison of the message with one or more variables.

8. The system of claim 7, wherein the logic is further configured to determine the selected event has occurred based upon the type of the incoming message.

9. The system of claim 1, wherein the input device is a text field-driven graphical user interface, and the data indicative of the selected event and the data indicative of the at least one selected operation are received from a user when the user enters data into the text field-driven graphical user interface.

10. The system of claim 1, wherein the input device is a script file, and the data indicative of the selected event and the data indicative of the at least one selected operation are automatically received from the script file.

11. A method, comprising:
receiving data indicative of a user-selected event corresponding to a particular message, wherein the user-selected event is defined by data indicative of a user-selected set of conditions to be met by contents of an incoming message, and data indicative of user-selected operation, the user-selected operation to be performed on the incoming message when the user-selected set of conditions has been met;
determining a first type of communication protocol that is being used in the incoming message from a first interface;
transmitting the incoming message to a communication protocol emulator based on the type of communication protocol,
translating, by the communication protocol emulator, contents of the incoming message from the first interface into a translated message in standard format;
determining what type of an event has occurred based on the contents of the incoming message;
determining when the user-selected set of conditions have been met based upon the translated message;
performing the user-selected operation when the set of user-selected conditions have been met;
translating the translated message to a format compatible with a second interface;
transmitting the translated message to the second interface; and
storing data indicative of one or more messages associated with data indicative of steps to be performed by the logic for performing the one or more message,
wherein the data indicative of steps to be performed by the logic further comprises data indicative of steps performed by the logic for translating the message, steps performed by the logic for determining an event has occurred, based on contents of the one or more message, and steps to be performed by the logic for performing at least one operation on the one or more messages.

12. The method of claim 11, further comprising:
displaying a graphical user interface; and
entering the data indicative of the selected event and data indicative of the least one selected operation to be performed on the incoming message if the selected type of event occurs.

13. The method of claim 11, further comprising receiving the incoming message through a first interface.

14. The method of claim 13, further comprising performing an operation comprising one or more of modifying contents of the incoming message, routing the incoming message, deleting the incoming message, controlling other events upon receipt of the incoming message, performing calculations, controlling a display device based upon the incoming message, extracting one or more values from the incoming message, reading data from a file upon receiving the incoming message, or executing internal or external subroutines upon receipt of the incoming message.

15. The method of claim 13, further comprising transmitting the incoming message through a second interface.

16. The method of claim 15, wherein the first interface and the second interface are configured to communicate using the same protocol.

17. The method of claim 16, wherein the first interface and the second interface are configured to communicate using different protocols.

18. The method of claim 11, further comprising determining a type of the incoming message based upon the incoming message's message identifier, contents, occurrence, frequency, number of times the selected event has occurred, or comparison of the message with one or more variables.

19. The method of claim 18, further comprising determining the selected event has occurred based upon the type of the incoming message.

20. The method of claim 11, further comprising receiving the data indicative of the selected event and the data indicative of the at least one selected operation from a field-driven graphical user interface.

21. The method of claim 11, further comprising automatically receiving the data indicative of the selected event and the data indicative of the at least one selected operation from a script file.

* * * * *